United States Patent
Liu et al.

(10) Patent No.: US 8,137,858 B2
(45) Date of Patent: Mar. 20, 2012

(54) METHOD OF FABRICATING ELECTRODE CATALYST LAYERS WITH DIRECTIONALLY ORIENTED CARBON SUPPORT FOR PROTON EXCHANGE MEMBRANE FUEL CELL

(75) Inventors: Di-Jia Liu, Naperville, IL (US); Junbing Yang, Bolingbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 12/788,527

(22) Filed: May 27, 2010

(65) Prior Publication Data

US 2010/0233573 A1    Sep. 16, 2010

Related U.S. Application Data

(62) Division of application No. 11/368,116, filed on Mar. 3, 2006, now Pat. No. 7,758,921.

(60) Provisional application No. 60/684,864, filed on May 26, 2005.

(51) Int. Cl.
     *H01M 8/10*    (2006.01)
(52) U.S. Cl. ............................ 429/483; 427/58; 427/115
(58) Field of Classification Search .................. 427/115; 429/483
     See application file for complete search history.

(56) References Cited

U.S. PATENT DOCUMENTS

| 5,330,860 | A | 7/1994 | Grot et al. |
| 5,399,184 | A | 3/1995 | Harada |
| 5,521,018 | A | 5/1996 | Wilkinson et al. |
| 2004/0197638 | A1 | 10/2004 | McElrath et al. |
| 2004/0224217 | A1 | 11/2004 | Toops |

OTHER PUBLICATIONS

Wilson and Gottesfeld, Thin Film Catalyst Layers for Polymer Electrolyte Fuel Cell Electrodes, Journal of Applied Electrochemistry, vol. 22, 1-7 (1992).
Lefevre et al., Fe-Based Catalysts for the Reduction of Oxygen in Polymer Electrolyte Membrane Fuel Cell Conditions: . . . , Electrochimica Acta 48, 2749-2760 (2003).
Thompson et al., Introduction to Microlithography, Second Edition, American Chemical Society, ACS Professional Reference Book, Washington, D.C. (1994).

*Primary Examiner* — Dah-Wei Yuan
*Assistant Examiner* — Andrew Bowman
(74) *Attorney, Agent, or Firm* — Olson & Cepuritis, Ltd.

(57) ABSTRACT

A membrane electrode assembly (MEA) of the invention comprises an anode and a cathode and a proton conductive membrane therebetween, the anode and the cathode each comprising a patterned sheet of longitudinally aligned transition metal-containing carbon nanotubes, wherein the carbon nanotubes are in contact with and are aligned generally perpendicular to the membrane, wherein a catalytically active transition metal is incorporated throughout the nanotubes.

19 Claims, 10 Drawing Sheets

(a)

(b)

(c)

(d)

(e)

(f)

(g) 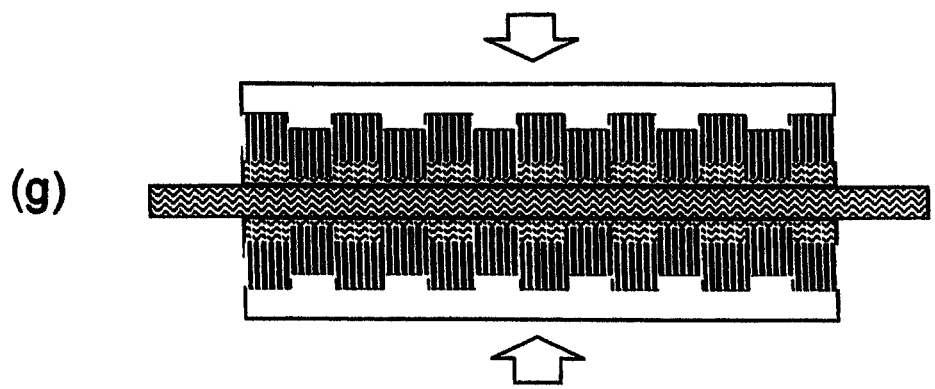
(h) 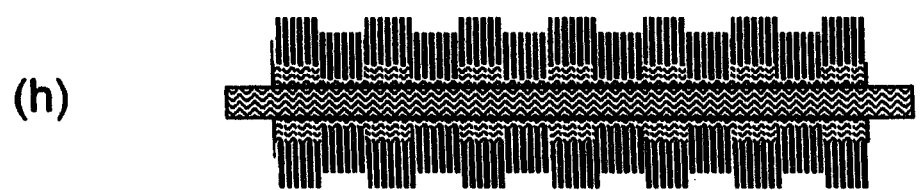
(i) 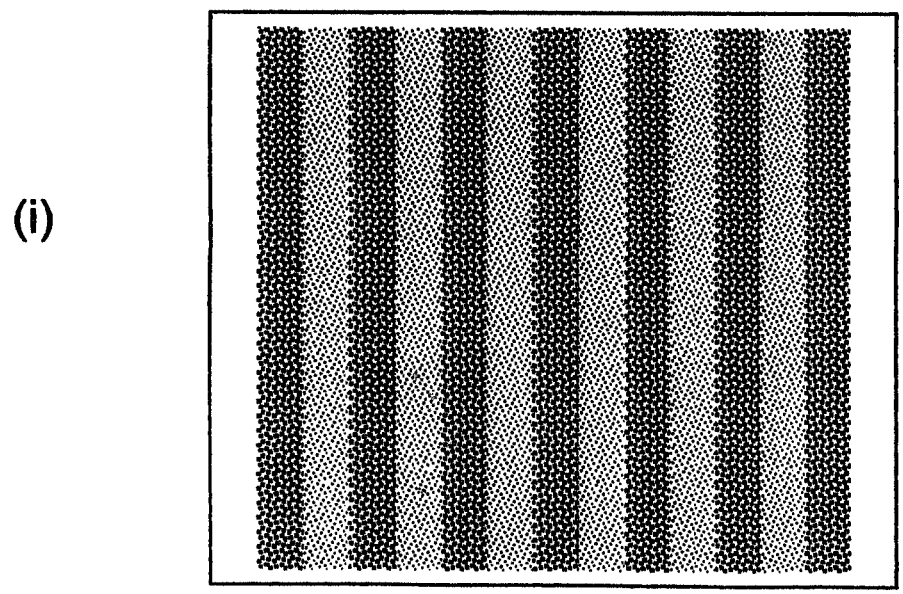
Fig. 2 - cont.

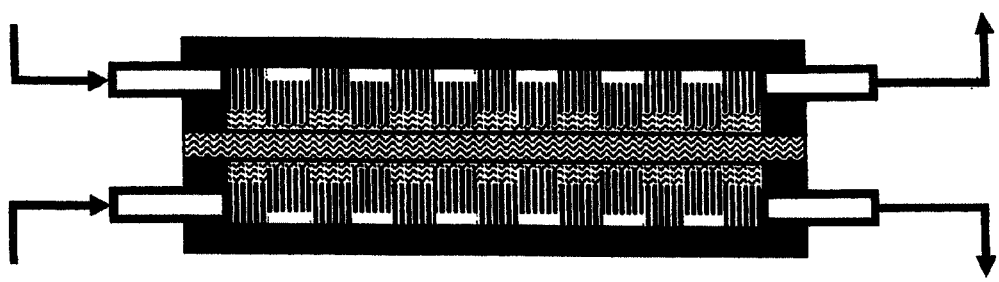
(j)
Fig. 2 - cont.

Aligned carbon nanotube bundles

Aligned carbon nanotube bundles transferred over electrolyte membrane

3D aligned carbon nanotube layer on quartz substrate

3D aligned carbon nanotube layer transferred on to membrane electrolyte

METHOD OF FABRICATING ELECTRODE CATALYST LAYERS WITH DIRECTIONALLY ORIENTED CARBON SUPPORT FOR PROTON EXCHANGE MEMBRANE FUEL CELL

CROSS-REFERENCE TO RELATED APPLICATIONS

This application is a divisional of U.S. application Ser. No. 11/368,116, filed on Mar. 3, 2006, now U.S. Pat. No. 7,758,921, which claims the benefit of U.S. Provisional Application Ser. No. 60/684,864 filed May 26, 2005, each of which is incorporated herein by reference in its entirety.

CONTRACTUAL ORIGIN OF THE INVENTION

The United States Government has rights in this invention pursuant to Contract No. W-31-109-ENG-38 between the U.S. Department of Energy and The University of Chicago and/or pursuant to Contract No. DE-AC02-06CH11357 between the United States Government, U.S. Department of Energy and UChicago Argonne, LLC representing Argonne National Laboratory.

FIELD OF THE INVENTION

This invention relates to the preparation of aligned carbon nanotubes with transition metal catalyst sites longitudinally spaced therealong and includes subject matter related to U.S. Provisional Application Ser. No. 60/692,773, filed Jun. 21, 2005, and non-provisional Application Ser. No. 11/368,120, filed on Mar. 3, 2006, each of which is incorporated herein by reference in its entirety.

BACKGROUND INFORMATION

The proton exchange membrane fuel cell (PEMFC) continues to benefit from intense development efforts for its potential application in automobiles and distributed power generation due to a number of inherent advantages including high efficiency, low noise and chemical emissions, and low operating temperature. A PEMFC typically consists of a membrane electrode assembly (MEA), gas diffusion electrode (GDE) layers and bipolar plates. The MEA consists of an anode, a cathode and a membrane electrolyte and is the key element of the fuel cell. During PEMFC operation, hydrogen is electro-oxidized at the anode. The proton thus produced is transported through the electrolyte and is combined with an oxide ion formed through the reduction of oxygen at the cathode. At present, the electrode catalyst materials used at the anode and the cathode are primarily platinum supported over amorphous carbon. Since platinum is a precious metal with limited supply, reducing its usage will result in significant reduction in PEMFC cost for the commercialization. One of the contributing causes of high precious metal usage is inefficient utilization of the precious metal the present electrode catalyst preparation method. Generally, the MEA preparation steps involve catalyst synthesis, ionomer/catalyst ink preparation and casting catalyst ink onto the membrane electrolyte. The catalyst synthesis usually is accomplished through a wet chemical process in which the precious metal precursor is deposited over a high surface area carbon followed by a chemical reduction. The electrode catalyst thus prepared has highly dispersed metal crystallites distributed throughout the surface of carbon black. The catalyst is subsequently mixed with a polymer solution, known as ionomer, to form the ink. The ink is then cast over each side of the polymer electrolyte through a hot-pressing method to form the MEA. An intrinsic limitation to this approach is that a significant amount of catalyst is embedded underneath of the polymer matrix during the hot-pressing, rendering it inaccessible to gas flow. Therefore, these catalyst can not participate in the electro-chemical reaction are thus considered under utilized.

A GDE is another key component in a PEMFC. The GDE is typically made of carbon paper or cloth treated with a hydrophobic coating. A GDE is packed at each side of the MEA between electrodes and the bipolar plates to improve the electric conductivity, humidity control as well as reactant gas distribution. A GDE adds additional manufacturing cost and complexity to a PEMFC fabrication. The bipolar plate in PEMFC is made of corrosion resistant, electric conducting materials such as graphite or surface treated stainless steel. Complicated gas flow channels, known as the flow field, are often required to be embossed on the bipolar plate surface to distribute the hydrogen or oxygen uniformly over each side of the MEA. The bipolar plate also electrically connects the adjacent fuel cell modules to form the PEMFC stack. Construction of a flow field on a bipolar plate adds cost and complexity to the PEMFC fabrication process.

Wilson and Gottesfeld summarized the conventional method of preparing membrane electrode assemblies for a PEM fuel cell as disclosed in Wilson and Gottesfeld, *Journal of Applied Electrochemistry* 22, (1992) pp. 1-7, incorporated herein by reference, discloses the method of forming thin film catalyst layers for MEA by preparing ink containing amorphous carbon supported precious metal, followed by applying the ink and hot-pressing. Grot and Banerjee U.S. Pat. No. 5,330,860 incorporated herein by reference, further describes a method of preparing electro-catalyst ink and frication of MEAs with such ink. Harada U.S. Pat. No. 5,399,184 incorporated herein by reference, discloses a method of making MEAs and a fuel cell assembly with gas diffusion electrodes (GDE). Wilkinson et al. U.S. Pat. No. 5,521,018 and disclosed herein by reference, discloses a design of bipolar plate with embossed fluid flow field that has functions of conducting electricity and directing the reactant gas flow.

The inventive method is different from these conventional approaches because: (a) there is no need to prepare a carbon based catalyst ink through mixing before transferring the films to MEAs. Aligned carbon nanotube layers are transferred to a membrane electrolyte with the nanotube orientation and pattern remaining intact: (b) the aligned carbon nanotubes in the present invention have excellent electric conductivity and hydrophobicity, therefore rendering the application of GDE unnecessary; (c) a gas flow field pattern can be optionally built during the preparation of the aligned carbon nanotube bundles according to the invention; therefore, there is no need for embossing the flow field in bipolar plate thus minimizing the manufacturing cost.

A recent patent application by McElrath et al. U.S. Publication No. 2004/0197638 A1, incorporated herein by reference, discloses a method of preparing a membrane electrode using carbon nanotube materials including the steps of suspending nanotubes in solution, filtering nanotubes to form thin mat or dried catalyst ink over a membrane electrolyte. This invention is different in the following aspects: (a) carbon nanotubes are transferred directly to the membrane electrolyte without liquid suspension or filtration; and (b) carbon nanotube bundles are aligned in the same direction with optional 3-dimensional pattern whereas the carbon nanotubes in the prior art can not be aligned due to limitations in the method of preparation.

Another recent patent application by Toops, U.S. Publication No. US 2004/0224217 A1, disclosed herein by reference, discloses a method of preparing aligned carbon nanotube for MEA fabrication by pyrolyzing hydrocarbons inside of porous channels of an anodized alumina template, followed by dissolving the alumina with acid. This invention is superior in the following aspects: (a) the aligned carbon nanotubes in this invention are prepared through growth over a substrate plate through chemical vapor deposition without the need of an alumina template to guide the vertical alignment, obviating the cost of an alumina template and the acid removal process; and (b) this method can produce carbon nanotube electrodes with three dimensional patterns as the result of the preparation of substrate. After transferring on to the membrane electrolyte, a pattern can be formed in which certain nanotubes are lower in height than the neighboring ones. One of such patterns is the straight channel, as is shown in FIG. 6. These channels serve as the distribution conduits for the reactant gas flows uniformly throughout the electrodes, which have advantage of replacing flow field in bipolar plate in the conventional design. In addition, the electrode prepared with the aligned carbon nanotubes according to the invention has higher nanotube density than the prior art. Because the inventive method is template free, nanotubes can grow closely and in contact with each other, as is shown in FIG. 4. The prior art requiring alumina templates does not have this flexibility.

SUMMARY OF THE INVENTION

This invention relates to a new method of preparing a membrane electrode assembly (MEA) for a PEMFC that reduces precious metal usage, eliminates the need for GDE and simplifies the design and fabrication of bipolar plates. The inventive method consists of multiple steps including growing template-free aligned carbon nanotubes, transferring directionally aligned nanotubes onto the surface of a polymer electrolyte, and fabricating a fuel cell with flow field-free bipolar plates. This new method also leads to a new PEM fuel cell design in which either or both anode and cathode are made of aligned carbon nanotubes with a portion of the nanotubes embedded in a proton conduction polymer and another portion exposed to reactant gas flow contacting the bipolar plates directly. The aligned nanotubes can also be built optionally with a pre-designed flow field pattern. MEA design eliminates the need for GDE and the necessity of embossing flow fields on the surface of bipolar plates.

An important object of the invention is to prepare a three-dimensional, aligned carbon nanotube with a pre-designed gas flow pattern, using a silicon or a silica transfer substrate with a 3D gas flow pattern prepared through coating a layer of photo-sensitive polymer, followed by exposing ultraviolet light over the photo-mask, washing off the unpolymerized coating layer, acid etching of the substrate and removal of polymerized layer. Carbon nanotube bundles can be grown and form a vertical 3D layer with the same pattern as that of the photomask. Both positive and negative photo-resist coatings, as is known in the art, can be used for this purpose.

Another object of the invention is providing a metal substrate for the aligned carbon nanotube growth such as nickel and stainless steel, with a 3-dimensional pattern therein by machining such as milling, stamping, engraving as is known in the art.

Yet another object of the invention is to provide a three-dimensional pattern ACNT having a pattern of a fluid flow field channel distributing reactant gas uniformly throughout the area defined by the nanotube bundles. Such flow field channels can have a wide variety of patterns, i.e. straight line, wavy line, serpentine line, and other shapes known in the art.

Another object of the invention is to transfer precious metal based electrode catalyst material to the aligned carbon nanotubes through wet chemistry method or through vapor deposition method, as known in the field of the art.

A further object of the invention is to incorporate highly dispersed catalytically active transition metals into the aligned carbon nanotube during the chemical vapor deposition step with or without chemically associated nitrogen.

A still further object of the invention is to transfer aligned carbon nanotubes from the substrate to a membrane electrode through a hot-press method to produce a MEA with aligned carbon nanotube oriented perpendicular to the membrane surface.

Another object of the invention is to provide a MEA containing aligned carbon nanotubes with 3-D pattern on one or both sides of the electrolyte membrane and perpendicular thereto and may function as flow fields for reactant gases to improve the electric conductivity or the distribution of gases. The aligned carbon nanotubes can be used as the support for electrode catalysts or have electrocatalytic function for an oxygen reduction reaction.

A final object of the invention is to provide PEM fuel cells wherein the inventive MEA remove the need of embossing a flow field on the bipolar plates. Furthermore, graphitic carbon nanotubes contact directly the bipolar plates with improved electric conductivity and remove the need of a gas distribution electrode (GDE). Such improvements simplify the PEM fuel cell manufacturing process and reduce the cost.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
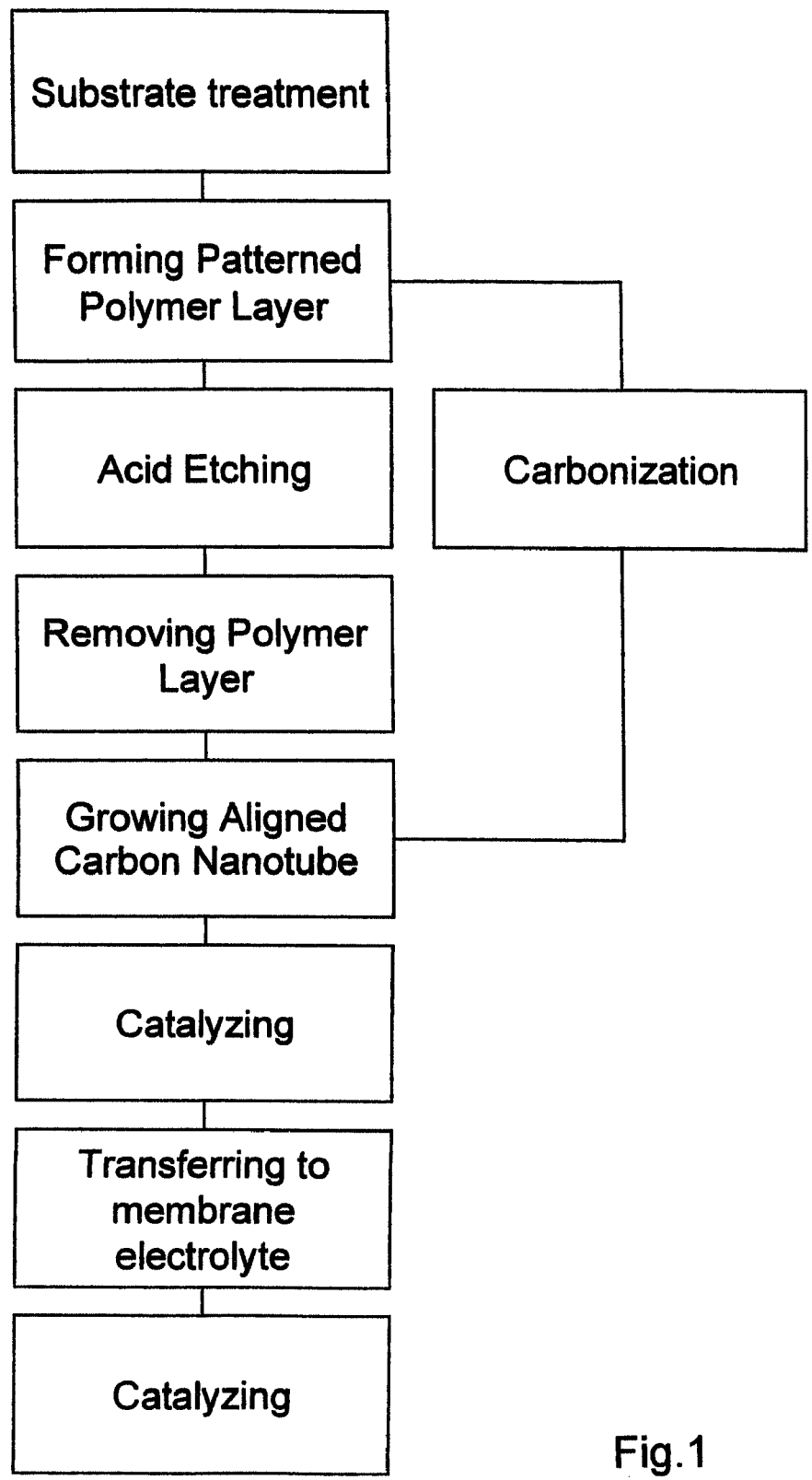
FIG. 1 is a flow chart illustrating steps in the inventive process.

The method of preparing an electrode catalyst layer with a 3-dimensional aligned carbon nanotube for a PEMFC can be described according to the process map shown in FIG. 1.

Figure 2:
FIG. 2(*a*)-(*j*) are schematic representations of articles made during the process of producing a PEMFC.
Figure 2:
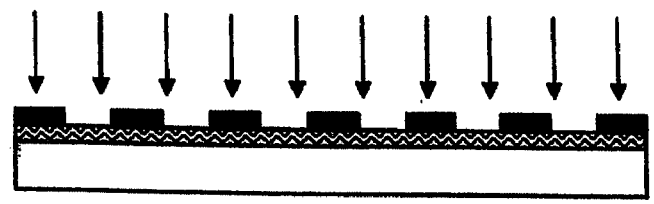
Figure 2:
Figure 2:
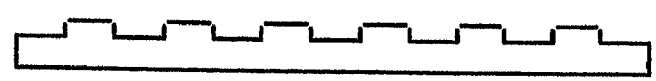
Figure 2:
Figure 2:

The first step involves the preparation of the surface of the substrate for nanotube growth. In the preferred embodiment of the invention, the substrate is made of silicon or silica (silicon dioxide) plates that are tolerant to temperature up to 1000° C. Specifically, the substrate plate is made by quartz. The preparation includes immersing the quartz substrate plate into a hot liquid bath containing a mixture of concentrated sulfuric acid (98%) and hydrogen peroxide solution (30%) at the temperature below 100° C. After rinsing with deionized water, the substrate plate is further cleaned in an ultrasonic bath containing acetone for 30 to 60 minutes, before being dried at room temperature. After drying, the substrate is coated with a layer of photo-resist polymer through a spin-on coating process. The photo-resist polymers used for this purpose can be either positive or negative, or any other types known in the art. An example of the negative photo-resist polymer solution for the coating process contains N-(hydroxymethyl)acrylamide, triphenylsulfonium triflate and polyvinyl alcohol (PVA) mixed in a deionized water and acetonitrile solution. After drying and curing in a vacuum oven at mild temperatures around 80° C., a thin layer of photo-resist layer was formed on the surface of the glass substrate, as is shown in FIG. 2a. In the preferred embodiment of invention, the coating layer thickness ranges from about 0.5 to about 3 microns (μm). An example of the positive photo-resist polymer solution is diazonapthoquinone and Novalac resin dissolved in propylene glycol methyl ether acetate, such as that marketed under brand name Shipley S1818. A similar drying and curing process is also needed for positive photo-resist coating. Other substrate materials such as nickel, stainless steel, and other metals can be used as substrates. In the case of metal substrate, a 3-dimensional pattern can be applied to the surface of the substrate through method of machining such as milling, stamping, engraving as is known to those of ordinary skill in the art.

The second step involved forming a pattern polymer layer over the substrate surface through a photolithographic method, with a method known in the art, as described in L. F. Thompson et al., *Introduction to Micro Lithography*, 2d Ed., American Chemical Society, Washington, D.C. (1994), and incorporated herein by reference. A photo-mask with a pre-selected pattern, such as that of a gas flow field channel pattern, was placed over the substrate coated with a photo-resist layer, followed by the exposure of a light source, such as an ultraviolet lamp. The optical opaque region of the photo-mask blocked the illumination from reaching the coated layer underneath while the unblocked region was fully exposed, as is shown in FIG. 2b. For a negative photo-resist, the polymer coating in the exposed region undergoes a cross-linking process and become insoluble whereas the coating in the unexposed region is washed away by the deionized water. In the case of positive photo-resist, the coated layer exposed under the radiation becomes soluble in the developing solution and subsequently is removed. The unexposed coating remains intact after the development. The gas flow field channel can have a variety of patterns such as straight line, wavy line, serpentine line, and any other shapes that are desired.

The third step of the invention involves forming a three-dimensional pattern on the substrate over the photo lithographed coating from step 2 using an acid etching method. An acid solution, generally containing the mixture of hydrofluoric acid and ammonia fluoride, is used to dissolve uncovered glass surfaces at ambient or slightly above ambient temperature. The acid etching process did not stop until a predetermined depth was reached, as that is shown in FIG. 2c. In the preferred embodiment of invention, the depth ranged from about 1 micron to about 50 microns.

An alternative embodiment of the invention in step 3 is to remove the patterned polymer layer from $2^{nd}$ step through a carbonization step without undergoing the acid etching process. The removal can be accomplished by carbonizing the coated layer in dry air at an elevated temperature in the range of from about 400° C. to about 900° C. The glass substrate thus prepared can also be used for growing aligned carbon nanotube in step 5, as will be discussed later.

The fourth step of the invention involves removing the coated layer and re-cleaning the surface after acid etching process. The removal can be accomplished by calcining the patterned substrate in dry air at the temperature ranging from about 400° C. to about 900° C., followed by a cleaning procedure similar to that discussed in the step one. A 3-D surface on the substrate is thus formed ready for aligned carbon nanotube growth, as is shown in FIG. 2d.

The fifth step of the invention involves forming the aligned carbon nanotube over the prepared substrates from the above steps using a chemical vapor deposition (CVD) method. The CVD process is carried out inside of tubular quartz reactor in a two-zone furnace in which the temperature of each zone can be individually controlled. In one embodiment of the invention, phthalocyanine containing transitional metals such as iron phthalocyanine (FePc) or cobalt phthalocyanine (CoPc) is placed in the first heating zone of the reactor which is typically operated from about 300° C. to 800° C. In the preferred embodiment, FePc is placed in $1^{st}$ heating zone operated from about 500° C. to about 700° C. The iron phthalocyanine is vaporized at these temperatures and the vapor is carried by a flowing gas mixture of argon and hydrogen into the second heating zone of the reactor where the patterned substrates are placed. The ratio of $Ar/H_2$ ranges from about 10:1 to about 5:5 and the temperature of the $2^{nd}$ heating zone ranges from about 700° C. to about 1000° C. The phthalocyanine vapor pyrolyzes at these temperatures on the surface of the substrates and forms three-dimensional aligned carbon nanotube bundles, as is shown in FIG. 2e. In addition to Fe and Co phthalocyanines, other transition metal compounds such as nickel phthalocyanine (NiPc) can also be used. Furthermore, the organometallic compounds with the structure of a transition metal coordinated by four nitrogen from the surrounding pyrrolic nuclei can also used for this purpose. Such compounds include transition metal porphyrins and their derivatives. Examples include iron porphyrin, cobalt porphyrio. Moreover, various mixtures of any of the above are useful.

Another embodiment of the invention involves preparing aligned carbon nanotube using an organometallic compound and organic aromatics mixture. In the preferred embodiment, the organometallic compounds are transition metal phthalocyanines and metallocenes such as iron phthalocyanine and ferrocene. The organic aromatics are xylene, toluene, benzene, pyridine, as well as others. The organometallic is generally fully dissolved in the aromatics to form a liquid mixture. The liquid was injected into the $1^{st}$ heating zone of the reactor with a temperature ranging from about 150° C. to 500° C. The injected mixture vaporized and mixed instantaneously with an Ar—$H_2$ carrying gas and was carried into the $2^{nd}$ heating zone of the reactor where the temperature was controlled at from about 600° C. to about 900° C. The mixture decomposed on the surface of the patterned substrate and aligned nanotube bundles were formed through pyrolysis. The aligned carbon nanotubes produced through the above described CVD processes have, in general, a multi-wall configuration which refers to a tube composed of multiple layers of cylindrical graphic sheets. The graphitic carbon nanotubes thus prepared had average diameters ranging from about 5 to about 100 nanometers and lengths ranging from about 3 to about 80 microns. The aligned carbon nanotubes on the surface of the substrate generally had similar lengths, as are shown in FIG. 2e when the reaction temperature and gas mixture were identical and when the substrate was treated according to step 4.

Yet another embodiment of the invention is to grow the patterned aligned carbon nanotube following the carbonization process as an alternative step to bypass step 3 and 4. In this case, a very thin layer of amorphous carbon is formed after calcination of the coated layer. Such amorphous carbon layer prohibits the growth of aligned nanotube whereas the aligned nanotube will grow over the uncoated portion. Therefore, a pattern nanotube layer can still be formed on the cleaned substrate surface whereas the amorphous carbon layer is free of nanotubes.

Yet another embodiment of the invention involves using a gas mixture containing ammonia instead of argon-hydrogen only. More specifically, the gas mixture consisted of $NH_3$, $H_2$ and Ar with the relative ratios ranging from about 1:4:10 to about 3:6:6 used as carrying gas for the application in both embodiments mentioned above, especially when FePc and ferrocene were selected for the nanotube growth. N—Fe—N bond may have been formed during the pyrolysis processes in the $2^{nd}$ reactor zone when $NH_3$ is present in the carrier gas. The functioned group was embedded in the graphitic structure on the surface of carbon nanotubes longitudinally spaced and had electro-catalytic activity for reducing oxygen to oxide ion in an oxygen reduction reaction (ORR) occurring at a cathode during PEM fuel cell operation as disclosed in M. Lefevre et al., *Electrochimica Acta* 48 (2003), pp. 2749-2760, and incorporated herein by reference. The advantage of such approach is to reduce or to eliminate the usage of platinum at the cathode with aligned carbon nanotubes with embedded N—Fe—N groups to significantly decrease the cost of a PEM fuel cell.

The sixth step of the invention involves catalyzing the aligned carbon nanotubes to functionalize them with electro-catalytic activity for either anode or cathode application. Highly dispersed transitional metal or precious metal crystallites can be formed on the nanotube surface through various wet chemical methods with the catalytic precursor solution followed by the heat treatment, as known in the art. The catalyst precursors include the solutions of transitional metal or precious metal salts, such as nitrate, sulfate, sulfite, chloride, etc. The methods of depositing metal solution over aligned carbon nanotube include impregnation, wet-incipient, redox precipitation, etc. After the wet chemical treatment, the aligned carbon nanotubes were dried in dry air, followed by the reduction in flowing hydrogen at elevated temperature. The reduction temperature typically ranges from about 150 to about 550° C. In a preferred approach, the reduction is carried in flowing hydrogen in the temperature range of from about 150 to about 450° C. The metal ions were reduced to their zero valence state after the reduction and the catalyzed carbon nanotube can now be used as electrode catalyst. In an alternative embodiment of the invention, the electrode catalyst can also be coated over aligned carbon nanotubes through vapor deposition of a precious metal precursor in vacuum at elevated temperature, as is known in the art. Yet another alternative embodiment to the current invention is to postpone the catalyzing step after transferring the aligned carbon nanotube to the polymer electrolyte, as is shown in the process map in FIG. 1.

The seventh step of the invention involves transferring and connecting the aligned carbon nanotubes to the surface of the membrane electrolyte. This is actually a two-stage process. The first stage involves applying a solution of polymer that is compatible to the electrolyte material to the top of the aligned carbon nanotube layer over the substrate. For example, if NAFION® ionomer is used as the membrane electrolyte, NAFION® ionomer solution is used. For the preferred embodiment, the NAFION® ionomer solution contains 5% polymer solid content. The application methods can be spraying, painting, liquid dropping, or any other art recognized method. After coating by polymer solution, the supported carbon nanotube tube is dried in air or in vacuum at the room temperature or up to about 150° C. A decal with a polymer layer coated on the top of aligned carbon nanotube is formed at the end of the stage, as is shown in FIG. 2f. The second stage of the process involves transferring the decal to the polymer electrolyte using a hot-press method. The hot-press is accomplished by applying pressure uniformly over the substrate surface while maintaining the platen at elevated temperature. The pressure of the press ranges from about $1.5 \times 10^5$ $N/m^2$ to about $7.5 \times 10^6$ $N/m^2$ and the temperature of the platen ranges from about 180° C. to about 230° C. The pressing time ranges from about 3 to about 8 minutes. In the preferred embodiment, the pressure of the press ranges from $3.5 \times 10^5$ $N/m^2$ to $7.5 \times 10^5$ $N/m^2$ and the temperature of the platen ranges from about 200 to about 220° C. The hot-pressing can be carried from both side of the membrane simultaneously, as shown in FIG. 2g, or to be performed on individual side separately. The polymer coating from the first stage will be fused into the membrane during the hot-press process. After the completion of hot-press, the decal/membrane assembly is removed and cooled to room temperature. The MEA can subsequently be peeled off from the substrate with the aligned carbon nanotube layer attached, as is shown in FIG. 2h. In another embodiment, the peeling off can be assisted after briefly immersing the substrate with nanotube coated MEA in a fluoric acid solution. FIG. 2i shows the top view of the MEA with channel aligned nanotube bundle patterns originated from step 2 and step 3. The channels pattern can be straight (as is shown in FIG. 2i), wavy, serpentine, or any other desired shape that can be generated through any applicable photo-lithographic method. The channels serve as flow fields to guide the reactant gas at both the anode and the cathode; therefore the shape is determined by the required gas distribution in a specific PEM fuel cell.

The aligned carbon nanotubes can be catalyzed after the MEA fabrication if they have not been previously catalyzed. The catalyzing method is similar to that outlined in step 6 except that the hydrogen reduction temperature is limited to less than about 200° C. to minimize the potential damage to the polymer membrane.

The eighth step of the invention involves assembling the individual PEMFC by packaging the aligned carbon nanotube MEAs with the bipolar plates, as is shown in FIG. 2j. In the current embodiment of the invention, the bipolar plate contains a gas inlet and a gas outlet. The bipolar plate does not need to have flow field patterns embossed on its contact surface with the MEA, as the pre-designed aligned carbon nanotube pattern serves as the conduit for gas distribution. A portion of the aligned nanotubes protruding outward against the surface of the bipolar plate generates the electric contact between the MEA and the bipolar plate. The bipolar plate can be fabricated from a variety of electric conducting materials such as graphite, stainless steel and other metals with corrosion prevention treatment, if required.

As seen therefore, there has been provided methods of making bundles of longitudinally aligned graphitic nanotubes having catalytically active transition metal incorporated longitudinally thereof. The nanotubes may be straight or spiral or bamboo in shape and may be open at one or both ends. Nitrogen atoms preferably are chemically bonded to some of the transition metals to provide catalytic activity in the acid environments of a PEMFC. The aligned carbon nanotubes (ACNTs) formed have transition metal atomically distributed throughout the graphitic structure.

Example 1

A thin quartz plate with dimension of 5/8 inch×1.5 inch×0.1 inch was cleaned in a solution containing 70 vol. % concentrated $H_2SO_4$ and 30 vol. % $H_2O_2$. The solution temperature was maintained between 70° C. to 100° C. After cleaning and rising with deionized water, it was ultrasonically cleaned in acetone for 30 min. The dried quartz plate was ready for the use as the substrate.

Example 2

A negative photo-resist solution was prepared by mixing the solution A and B where A is made by dissolving 184 mg of triphenylsulfonium triflate in 12 ml water/acetonitrile solution followed by mixing with 725 mg of N-(hydroxymethyl) acrylamide solution, and B was made by dissolving 2.029 g PVA in 20 ml water. The photo-resist solution was subsequently filtered through a 0.1 µm filtration paper and used for spin-coating on the treated quartz substrate according to Example 1 with a high speed spin-coater (Model 1-EC101DT-R485, Headway Research, Inc.). A pipette was filled with the photo-resist solution. The solution was dispensed over the quartz substrate in a droplet fashion while the coater spun at 2500 rpm for 30 seconds. The coating was baked at 90° C. for 30 minutes inside of a vacuum oven. A photo-mask with linear strip pattern was placed over the top of the coated quartz plate. An ultraviolet radiation with wavelength of 254 nm generated from an UV lamp (Mineralight, UVG-11) was applied to the coated plate through the photo-mask for 5 minutes. The exposed plate was subsequently baked in a vacuum oven at 130° C. for 8 min to complete the polymerization process for the irradiated region. The plate was then immersed in deionized water after being cooled to ambient temperature and was rinsed for 5 min. The unexposed portion of the coating was thus washed away. The quartz plate with a coated polymer pattern was then dipped into a hydrofluoric acid (HF) solution made with 9 parts of water and one part of HF (49%) for 100 minutes. After rinsing and drying, the plate was calcined in flow air at 500° C. for one hour before cleaned again according to the method described in Example 1.

Example 3

A positive photo-resist solution was obtained under the brand name Shipley S1818, that contains diazonapthoquinone and Novalac resin dissolved in propylene glycol methyl ether acetate. The substrate prepared according to the Example 1 was first coated by a thin layer of hexamethyldisilazane (HMDS) via a spin coater before being coated with the photo-resist solution with the dry thickness about 2 microns. After baking in vacuum oven at 90° C. for 30 minutes, a photo-mask with linear strip pattern was placed over the top of coated substrate plate. An ultraviolet radiation with wavelength of 365 nm generated from an UV lamp (Ultra Violet Products, Model UVL-23RW) was applied to the coated plate through the photo-mask for 15 seconds. The exposed substrate was subsequently developed in an aqueous solution containing 5% tetramethylammonium hydroxide for 1 minute followed by rinsing in deionized water to wash away the exposed portion of the coating. After baking at 130° C. for 30 minutes, the patterned quartz substrate was etched in an acidic solution containing $NH_4F$ and HF for about 1 hour. The unprotected portion of the quartz was etched to form a 3 dimensional pattern. The substrate was then heated in air to 500° C. to burn off the remaining coating and cleaned again according to the steps described in Example 1. The substrate is now ready for growth of carbon nanotube.

Example 4

Figure 3:
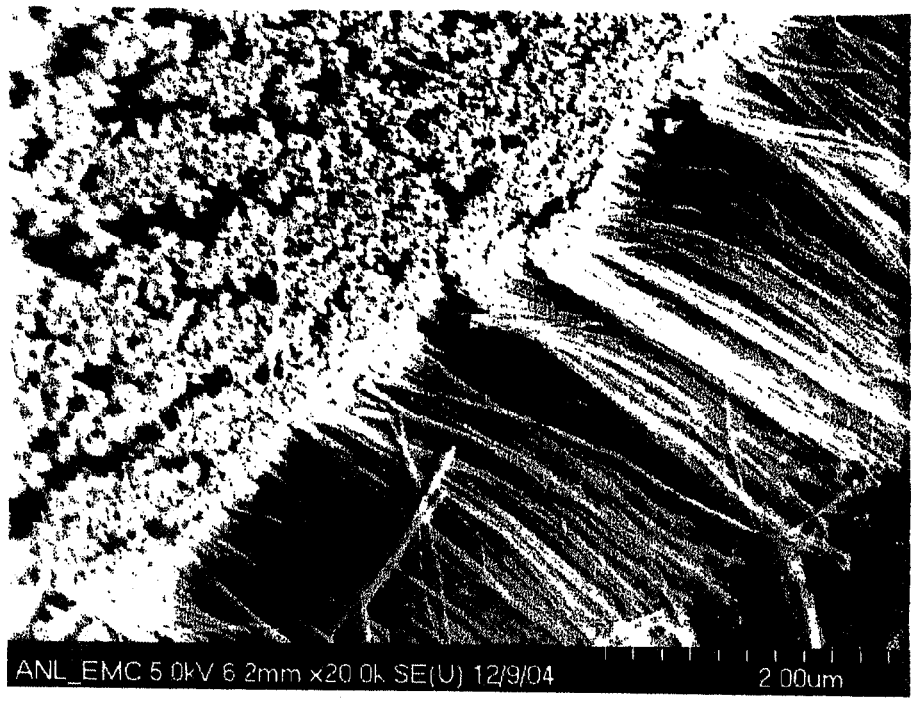
FIG. 3(*a*)-(*c*) show SEM images taken after a nanotube bundle was removed from a substrate.
Figure 3:
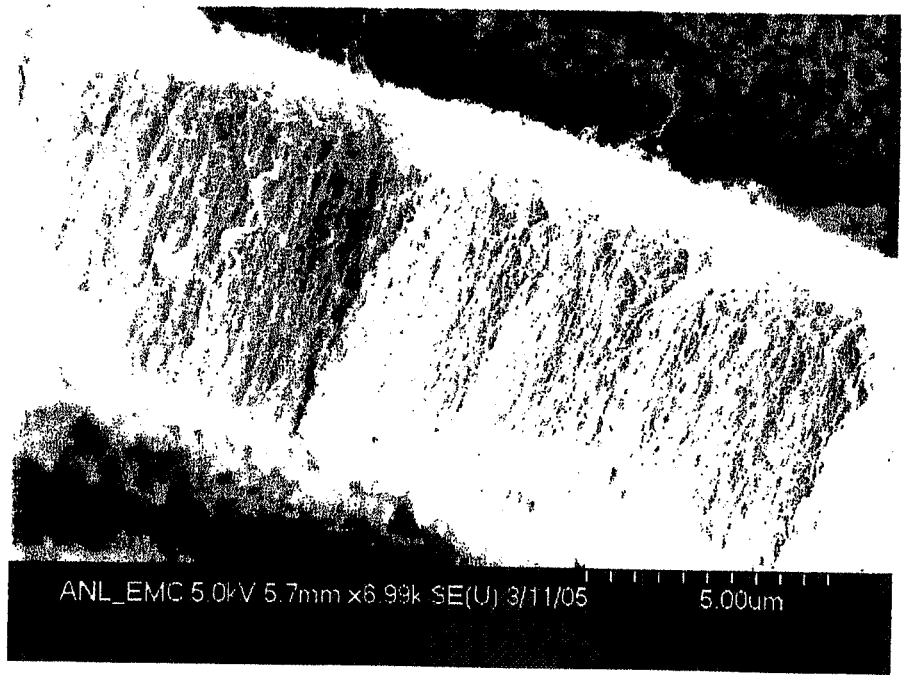
Figure 3:
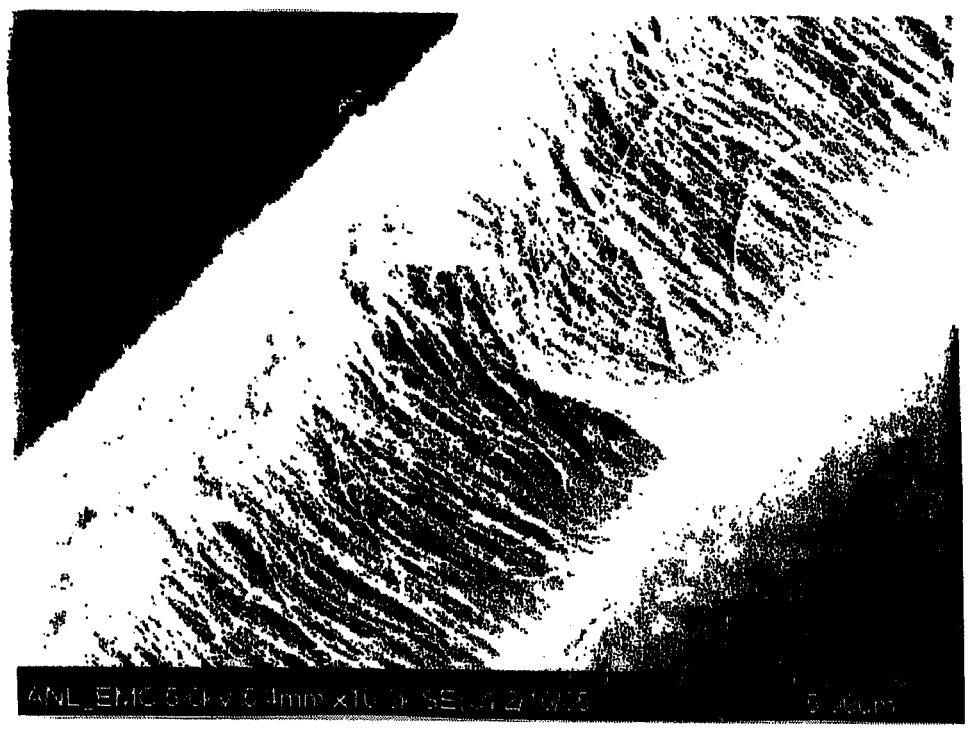

A quartz substrate prepared according to the Example 2 was placed inside of a tubular two-zone reactor where the temperature of each zone was controlled independently. 0.1 gram of iron phthalocyanine (FePc, 97% Aldrich) was placed in the first zone whereas the quartz plate is placed in the second zone. An argon-hydrogen (55%-45%) gas mixture entered the first zone with a total flow rate of 330 ml/min and carried the vaporized FePc into the second zone while the temperatures for the first and second zone were controlled at 550° C. and 850° C., respectively. After 30 minutes reaction time, a layer of aligned carbon nanotube was formed on the surface of the quartz substrate. Shown in FIG. 3 (a, b, and c) are SEM images taken after the a nanotube bundle was removed from the substrate.

Example 5

Figure 4A:
FIG. 4(*a*) and (*b*) show SEM image of the ends (a) of a nanotube bundle after removal from a quartz substrate, and sides (b).
Figure 4B:

A quartz substrate prepared according to the Example 2 was placed inside of a tubular two-zone reactor as described in Example 4. One gram of ferrocene was dissolved in 10 ml xylene and injected continuously into the first zone of the reactor using a syringe pump. The liquid feed was passed through a capillary tube and preheated to 180° C. to 225° C. prior to its entry into the furnace. At this temperature, the liquid exiting the capillary tube was immediately volatilized and swept into the second zone, which was kept at 725° C., by a gas mixture of argon-hydrogen-ammonia mixture (8:5:2) at the flow rate of 300 ml/min. After 30 minutes, aligned carbon nanotubes were formed on the surface of the quartz substrate. Shown in FIG. 4 is the top view image (a) of a nanotube bundle after it was removed from the quartz plate, and side image (b).

Example 6

Figure 5A:
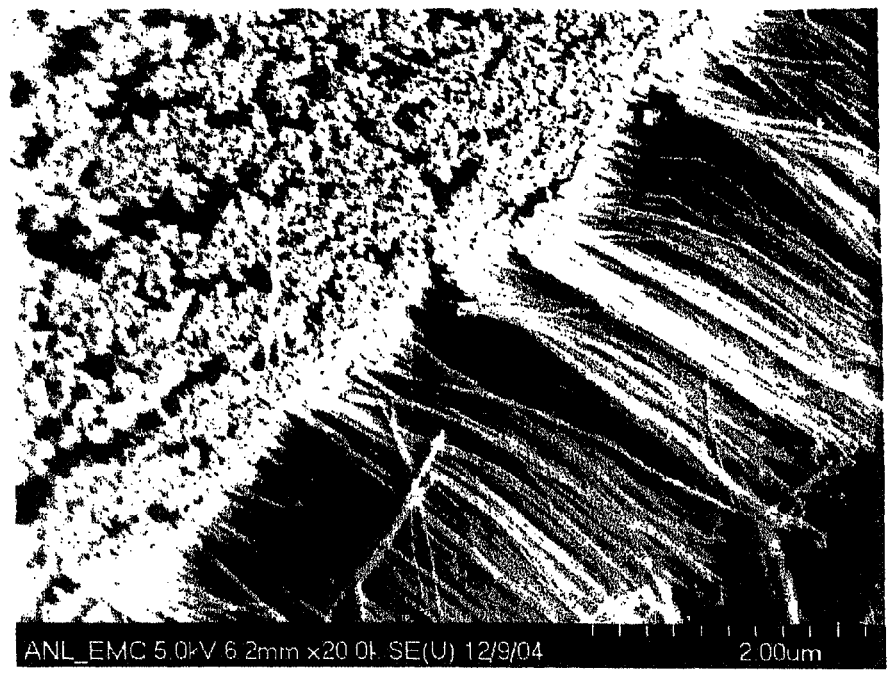
FIG. 5(*a*) and (*b*) are SEM images of a nanotube bundle removed from a substrate (a) and transferred to an electrolyte membrane (b) showing the transfer did not change the tube orientation.
Figure 5B:
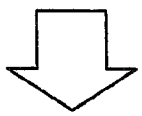
Figure 5B:
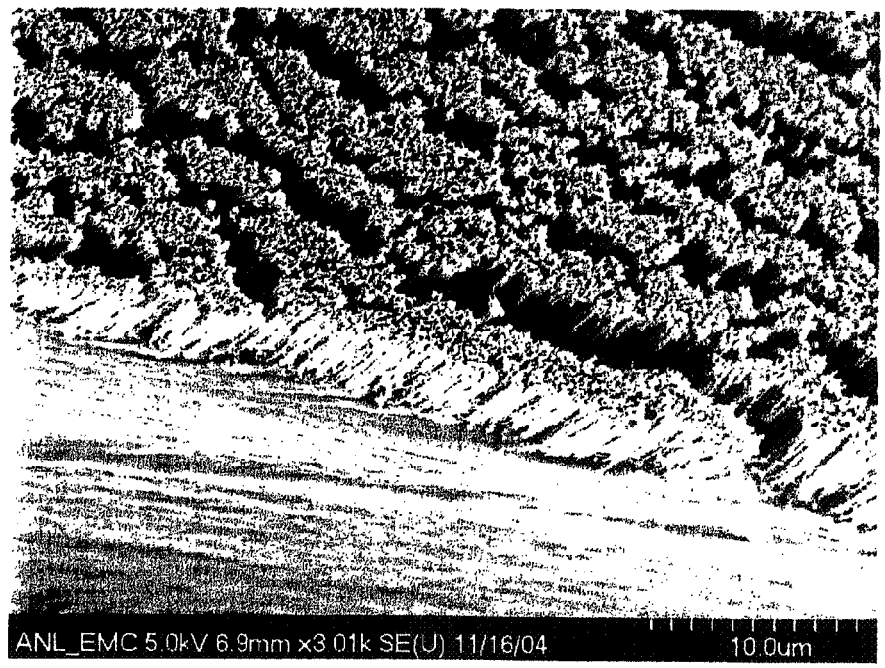

A layer of aligned carbon nanotube was prepared on a cleaned quartz substrate according to the procedure described in Example 4. The quartz plate with aligned nanotube was subsequently loaded on the spin coater and layer of NAFION® ionomer solution (5 wt. % solid, Aldrich) was spread over the nanotube layer by pipetting the solution while the coater rotated at 1000 rpm. The process lasted about 30 seconds. The process was repeated to apply a NAFION® ionomer solution on the second aligned nanotube substrate. After the solution was dried completely, the two substrates were placed at top and bottom of a NAFION® membrane (NAFION® 115, Aldrich) with the aligned nanotube side facing the film. The assembly was then placed on the platen of a commercial heated hydraulic press (Carver Laboratory) where the platen temperature was maintained at 200° C. A pressure was subsequently applied to the assembly at $7.5 \times 10^5$ $N/m^2$ for 5 minutes before it was removed. After the assembly was cooled to ambient temperature, the quartz plates were slowly peeled from the film. The aligned nanotubes were transferred to the surface of the membrane electrolyte without changing the tube orientation, as is shown in FIG. 5 (*a* and *b*).

Example 7

Figure 6A:
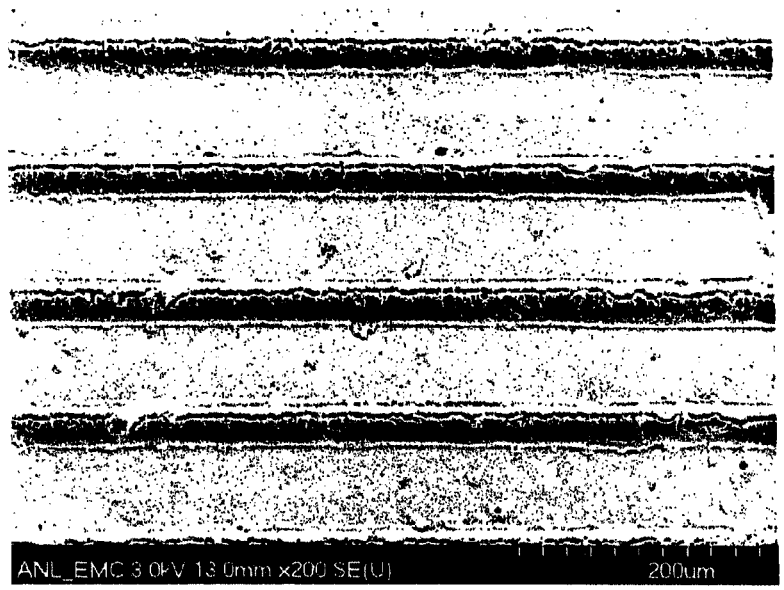
FIG. 6(*a*) and (*b*) show three dimensional (3D) patterns formed by nanotube on a substrate (a) and transferred to a membrane (b) forming a flow pattern thereon.
Figure 6B:
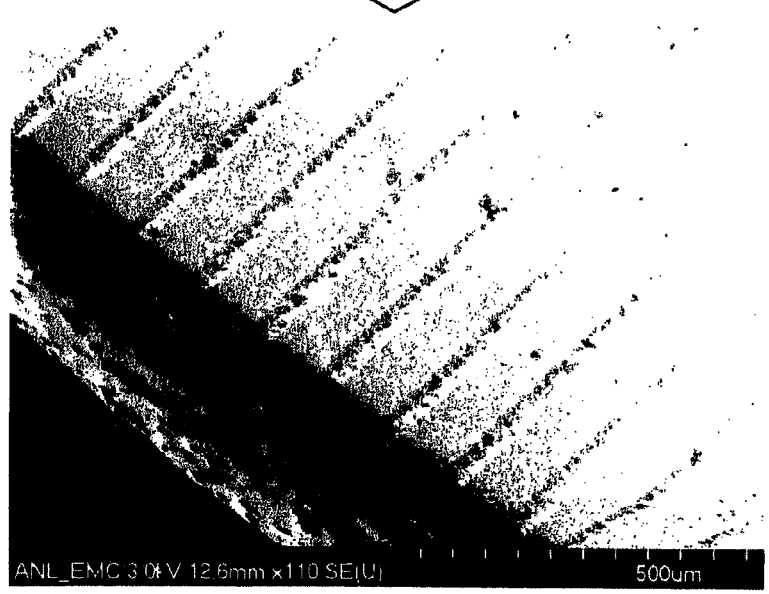

A quartz substrate prepared according to the Example 3 was placed inside of a tubular two-zone reactor using the same chemical vapor deposition mixture as described in Example 4. A uniform, three dimensional aligned carbon nanotube layer was grown on both low and high areas of the substrate, as is shown by the ridges and planes in FIG. 6*a*. Following the nanotube growth, NAFION® ionomer solution was applied to the top of the nanotube layer which was subsequently transferred to the NAFION® membrane through the hot press method described in Example 6. After the transfer, the side of the nanotube layer previously attached to the substrate was now exposed to the surface. The high and low areas of the nanotube layer were now reversed, as is shown in FIG. 6*b*.

While there has been disclosed what is considered to be the preferred embodiments of the present invention, it is understood that various changes in the details may be made without departing from the spirit, or sacrificing any of the advantages of the present invention.

The embodiments of the invention in which an exclusive property or privilege is claimed are defined as follows:

1. A membrane electrode assembly (MEA) comprising an anode and a cathode and a proton conductive membrane therebetween, the anode and the cathode each comprising a patterned sheet of longitudinally aligned transition metal-containing graphitic carbon nanotubes, wherein the carbon nanotubes are in contact with and are aligned generally perpendicular to the membrane, wherein a catalytically active transition metal is incorporated longitudinally and is atomically distributed throughout the graphitic carbon walls of said nanotubes, and transition metal or precious metal crystallites are present on the surface of the nanotubes.

2. The MEA of claim 1 wherein the catalytically active transition metal comprises Fe, Ni, Co, Cr, Mn, or a combination thereof.

3. The MEA of claim 1 wherein the catalytically active transition metal comprises Fe, Ni, Co, or a combination thereof.

4. The MEA of claim 1 wherein the nanotubes form a three dimensional pattern of gas-flow channels on the membrane.

5. The MEA of claim 1 produced by:
(a) introducing a combination of a transition metal-containing carbon nanotube precursor and a gaseous mixture comprising an inert gas and a reducing gas into a first reactor zone maintained at a first temperature and for a period of time sufficient to vaporize the transition metal-containing carbon nanotube precursor, introducing the vaporized material to a second reactor zone maintained at a second temperature that is higher than the first temperature and for a period of time sufficient to pyrolyze the transition metal-containing carbon nanotube precursor, and grow longitudinally aligned carbon nanotubes with a catalytically active transition metal incorporated throughout the nanotubes onto a substrate present in the second reactor zone, wherein the substrate is patterned with a template for forming longitudinally-aligned carbon nanotubes perpendicular to the substrate surface, and the carbon nanotube precursor is selected from the group consisting of a transition metal phthalocyanine, a transition metal porphyrin compound, a transition metal organometallic compound, or a combination thereof, optionally as a solution in an aromatic hydrocarbon solvent;
(b) introducing transition metal or precious metal crystallites onto the surface of the nanotubes;
(c) depositing a layer of an ionomeric polymer over the carbon nanotubes and drying the polymer to form a nanotube-containing polymeric decal having an outer polymeric side and an inner nanotube side in contact with the substrate;
(d) fusing the polymeric side of two such decals to both sides of a proton-conductive membrane at an elevated temperature and pressure; and
(e) removing the substrates to thereby form the MEA.

6. The MEA of claim 5 wherein the gaseous mixture comprises argon and hydrogen and optionally includes ammonia, and the transition metal-containing carbon nanotube precursor comprises Fe, Ni, Co, Cr, Mn, or mixtures thereof.

7. The MEA of claim 5 wherein the temperature in the first reactor zone is maintained in the range of from about 150° C. to about 700° C. and the temperature in the second reactor zone is maintained in the range of from about 700° C. to about 1000° C.

8. The MEA of claim 5 wherein the material is maintained in the reactor zones for a period of time in the range of from about 5 to about 45 minutes.

9. The MEA of claim 5 wherein the nanotubes form a three dimensional (3D) pattern of gas-flow channels on the membrane.

10. The MEA of claim 5 wherein the carbon nanotube precursor contains a transition metal selected from the group consisting of Fe, Ni, Co, and a mixture thereof.

11. The MEA of claim 5 wherein the nanotubes are generally straight or include spiral or bamboo shaped or bellows shaped nanotubes.

12. The MEA of claim 5 wherein one transition metal-containing nanotube decal of the MEA includes an oxidation catalyst and the other decal includes a reduction catalyst.

13. The MEA of claim 5 wherein a plurality of the MEAs are assembled into a proton exchange membrane fuel cell (PEMFC) by alternately stacking bipolar plates between the MEAs.

14. A membrane electrode assembly (MEA) comprising an anode and a cathode and a proton conductive membrane therebetween, one or more of the anode and the cathode comprising a patterned sheet of longitudinally aligned transition metal-containing graphitic carbon nanotubes, wherein the carbon nanotubes are in contact with and are aligned generally perpendicular to the membrane, wherein a catalytically active transition metal is incorporated longitudinally and is atomically distributed throughout the graphitic carbon walls of said nanotubes, and transition metal or precious metal crystallites are present on the surface of the nanotubes, and wherein the MEA is produced by:
forming a sheet of longitudinally aligned graphitic nanotubes on a substrate including a three dimensional pattern for aligning the nanotubes in a gas-flow pattern by chemical vapor deposition (CVD), and transferring the so-formed sheet of nanotubes to a surface of a proton conductive membrane, wherein the chemical vapor deposition comprises pyrolysis of a transition metal-containing organometallic material to form nanotubes that include the transition metal within the nanotube structure.

15. The MEA of claim 14 wherein the catalytically active transition metal comprises Fe, Ni, Co, Cr, Mn, or a combination thereof.

16. A membrane for a proton exchange membrane fuel cell (PEMFC) comprising a proton conductive membrane that includes longitudinally aligned graphitic carbon nanotubes generally perpendicular to the proton exchange membrane and in contact with a surface thereof, a catalytically active transition metal being incorporated longitudinally to the nanotubes and being atomically distributed throughout the graphitic carbon walls of said nanotubes, and transition metal or precious metal crystallites on the surface of the nanotubes.

17. The membrane of claim 16 produced by forming longitudinally aligned graphitic nanotubes with a catalytically active transition metal in the nanotubes on a substrate by chemical vapor deposition (CVD), transferring the longitudinally aligned graphitic nanotubes from or with the substrate to the proton conductive membrane with the longitudinally aligned graphitic nanotubes being generally perpendicular to the proton exchange membrane and in contact therewith.

18. The membrane of claim 16 wherein the catalytically active transition metal comprises Fe, Ni, Co, Cr, Mn, or a combination thereof.

19. The membrane of claim 16 wherein the nanotubes form a three dimensional pattern of gas channels on the surface of the membrane.

* * * * *